(12) United States Patent
Sripathi

(10) Patent No.: US 8,458,306 B1
(45) Date of Patent: Jun. 4, 2013

(54) COALESCING CHANGE NOTIFICATIONS IN AN I/O VIRTUALIZATION SYSTEM

(75) Inventor: Ramkumar Sripathi, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 128 days.

(21) Appl. No.: 12/862,977

(22) Filed: Aug. 25, 2010

(51) Int. Cl.
*G06F 15/177* (2006.01)

(52) U.S. Cl.
USPC .......................................... 709/221; 709/222

(58) Field of Classification Search
USPC ................................................ 709/221, 222
See application file for complete search history.

(56) References Cited

U.S. PATENT DOCUMENTS

2007/0130295 A1* 6/2007 Rastogi et al. ................ 709/220

* cited by examiner

*Primary Examiner* — Adnan Mirza
(74) *Attorney, Agent, or Firm* — Kilpatrick Townsend & Stockton LLP

(57) ABSTRACT

Efficient and effective mechanisms for coalescing change notifications such as Registered State Change Notifications (RSCNs) are provided. Multiple hosts are connected to an I/O director that allows virtualization of I/O resources including Host Bus Adapters (HBAs) for the various hosts. The I/O director is connected to a Fiber Channel switch. When an RSCN is received by the I/O director, the I/O director queries to Fiber Channel fabric to identify the state change and maintains information about the RSCN so that subsequent redundant RSCNs can be discarded. Change notification information is forwarded to the appropriate hosts connected to the I/O director.

16 Claims, 6 Drawing Sheets

| VHBA 201 | Storage 221 | LUN 241 |
|---|---|---|
| VHBA(s1) 203 | Storage1 223 | LUN S1A --- LUN S1Z 243 |
|  | Storage2 225 | LUN S2A --- LUN S2Z 245 |
| VHBA(s2) 205 | Storage1 223 | LUN S1A --- LUN S1Z 243 |
|  | Storage2 225 | LUN S2A --- LUN S2Z 245 |
| VHBA(s3) 207 | Storage1 223 | LUN S1A --- LUN S1Z 243 |
|  | Storage2 225 | LUN S2A --- LUN S2Z 245 |
| VHBA(s4) 209 | Storage1 223 | LUN S1A --- LUN S1Z 243 |
|  | Storage2 225 | LUN S2A --- LUN S2Z 245 |

Figure 2

| Storage 301 | VHBA 321 |
|---|---|
| Storage1 303 | VHBA(S1), VHBA2(S2), VHBA3(S3), VHBA4(S4)…. VHBAN(SN) 323 |
| Storage2 305 | |

Figure 3

COALESCING CHANGE NOTIFICATIONS IN AN I/O VIRTUALIZATION SYSTEM

TECHNICAL FIELD

The present disclosure relates to coalescing change notifications such as RSCNs (Registered State Change Notifications) in an I/O virtualization system.

DESCRIPTION OF RELATED ART

Change notifications such as RSCNs (Registered State Change Notifications) are messages sent by Fibre Channel (FC) fabric controllers to indicate to registered devices that a state change has occurred in the FC fabric. State changes include addition or removal of storage, addition or removal of FC switches, zone changes, etc. RSCNs will typically be generated to notify all registered devices about state changes. Each registered device is then responsible for querying the FC fabric to identify the change. However, RSCNs are not effectively managed, leading to inefficient FC fabric queries.

Consequently, it is desirable to provide improved mechanisms for managing change notification messages.

BRIEF DESCRIPTION OF THE DRAWINGS

The disclosure may best be understood by reference to the following description taken in conjunction with the accompanying drawings, which illustrate particular example embodiments.

FIG. 2 illustrates a mapping scheme for sending information associated with a change notification.

FIG. 3 illustrates another mapping scheme for sending information associated with a change notification.

DESCRIPTION OF PARTICULAR EMBODIMENTS

Figure 1:
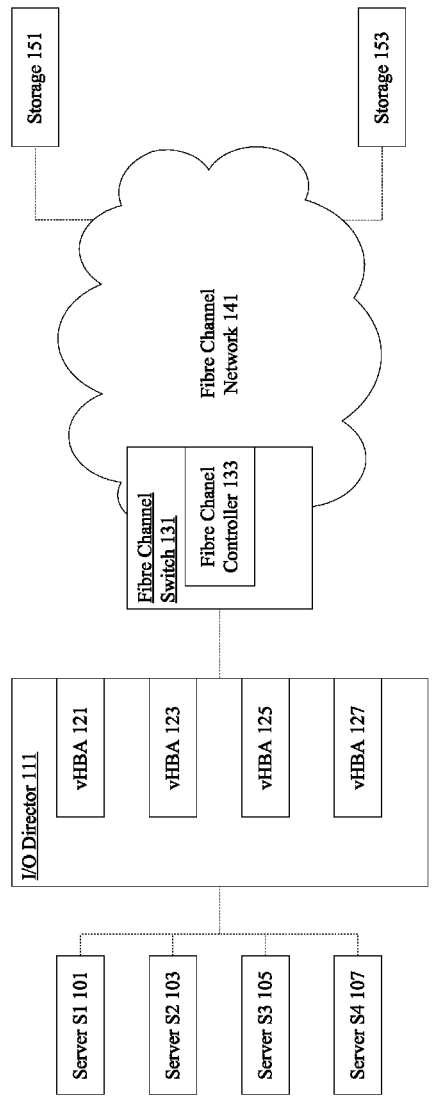
FIG. 1 illustrates one example of a system coalescing change notifications.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of a particular change notification message in a Fibre Channel fabric. However, it should be noted that the techniques and mechanisms of the present invention apply to a variety of different types of messages and networks. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Efficient and effective mechanisms for coalescing change notifications such as Registered State Change Notifications (RSCNs) are provided. Multiple hosts are connected to an I/O director that allows virtualization of I/O resources including Host Bus Adapters (HBAs) for the various hosts. The I/O director is connected to a Fibre Channel switch. When an RSCN is received by the I/O director, the I/O director queries to Fibre Channel fabric to identify the state change and maintains information about the RSCN so that subsequent redundant RSCNs can be discarded. Change notification information is forwarded to the appropriate hosts connected to the I/O director.

Example Embodiments

In an I/O virtualization system, an I/O director is connected to multiple hosts that use the I/O director to provide virtualized I/O resources, such as virtual Network Interface Cards (vNICs) and virtual Host Bus Adapters (vHBAs). The I/O director may include multiple virtual NICs (vNICs) and virtual HBAs (vHBAs) that are mapped to particular hosts. According to various embodiments, each vHBA performs a login and initialization process to identify each vHBA as a registered device to a FC switch. The FC switch maintains registration information. The same storage target may be accessible from many vHBAs sharing the same physical device and interface.

Change notifications such as RSCNs (Registered State Change Notifications) are messages sent by a Fibre Channel (FC) fabric controller to registered devices regarding state changes in elements within a given zone. When a FC port is shared by multiple virtual HBAs, RSCNs will arrive for all virtual HBAs connected to the same storage controller or processor. Receiving multiple RSCNs is redundant and leads to unnecessarily repeated fabric scans to discover state changes. The techniques and mechanisms of the present invention recognize that when multiple vHBAs on the same interface are zoned to the same target, the need for RSCN coalescing becomes important.

FIG. 1 illustrates one example of a system that can use the techniques and mechanisms of the present invention. Servers s1 101, s2 103, s3 105, and s4 107 are connected to the same port on the I/O director 111. The I/O director 111 includes vHBAs 121, 123, 125, and 127, which are mapped to s1 101, s2 103, s3 105, and s4 107 respectively. It should be noted that the server to vHBA correspondence need not be one-to-one. According to various embodiments, each vHBA 121, 123, 125, and 127 performs a login process with the FC switch 131. In particular embodiments, the login process is an N_Port ID Virtualization (NPIV) process that allows multiple N_Port IDs to share a single physical N_Port.

During the NPIV login process, each vHBA 121, 123, 125, and 127 registers to receive state change notifications from a fabric controller 133 on the FC switch 131. Each vHBA 121, 123, 125, and 127 will receive notifications of changes to the elements in a zone in a FC fabric 141.

Changes on the storage side of the FC fabric 141 such as changes involving storage 151 and storage 153 are transmitted to the initiator side using RSCNs. For example, storage 151 may be taken offline. Taking storage 151 offline will lead to the transmission of 4 RSCNs to the I/O director 111. According to various embodiments, one RSCN is sent to each VHBA 121, 123, 125, and 127. In typical implementations, four separate scans of the Fibre Channel fabric would result from the four RSCNs to determine changes in the zone. The scans are redundant because they provide the same information about the same device to each vHBA.

According to various embodiments, this redundancy is eliminated by using a mapping scheme to identify all the relevant initiators on the interface, i.e. the initiators sharing access to the device associated with the change. Repeated scans are eliminated by providing the information obtained from a single scan to all relevant initiators. Initiators may be hosts and servers. This reduces the number of scans operations on the zone and improves performance.

FIG. 2 illustrates one example of a mapping table. The mapping table includes VHBAs 201, storage 221, and local unit numbers (LUNs) 241. According to various embodiments, VHBA(S1) 203 is mapped to storage1 223 corresponding to LUN S1A-S1Z 243 and is also mapped to storage2 225 corresponding to LUN S2A-S2Z 245. VHBA(S2) 205 is mapped to storage1 223 corresponding to LUN S1A-S1Z 243 and is also mapped to storage2 225 corresponding to LUN S2A-S2Z 245. VHBA(S3) 207 is mapped to storage1 223 corresponding to LUN S1A-S1Z 243 and is also mapped to storage2 225 corresponding to LUN S2A-S2Z 245. VHBA(S4) 209 is mapped to storage1 223 corresponding to LUN S1A-S1Z 243 and is also mapped to storage2 225 corresponding to LUN S2A-S2Z 245. When a change associated with a LUN occurs, separate change notifications are sent to VHBA(S1) 203, VHBA(S2) 205, VHBA(S3) 207, VHBA(S4) 209.

In particular embodiments, changes on the storage side of the FC SAN are transmitted to the initiator side using RSCNs. According to various embodiments, storage1 223 may be taken offline, causing four RSCNs corresponding to VHBA(S1) 203, VHBA(S2) 205, VHBA(S3) 207, VHBA(S4) 209 to be sent towards the I/O director. Receipt of the four RSCNs at VHBA(S1) 203, VHBA(S2) 205, VHBA(S3) 207, VHBA(S4) 209 would result in four separate scans or queries of the fabric to determine what changes occurred in the zone. It is recognized that these scans or queries are redundant since they provide the same information to the same virtualized HBA interface on the I/O director. Queries consume valuable resources, and it is recognized that FC fabric performance can be significantly affected by unnecessary queries.

FIG. 3 illustrates one example of a mapping table that can be used to coalesce change notifcations. The mapping table includes storage 301 and VHBAs 321. Storage1 303 is mapped to the set of VHBAs on the same I/O director VHBA interface including VHBA(S1), VHBA2(S2), VHBA3(S3), VHBA4(S4) . . . . VHBAN(SN) 323. Storage 305 is also mapped to the set of VHBAs on the same I/O director VHBA interface including VHBA(S1), VHBA2(S2), VHBA3(S3), VHBA4(S4) . . . . VHBAN(SN) 323. According to various embodiments, when a first RSCN is received, notifications are forwarded to devices associated with the set of VHBAs including VHBA(S1), VHBA2(S2), VHBA3(S3), VHBA4(S4) . . . . VHBAN(SN) 323. Subsequent RSCNs associated with the same device can be effectively dropped. According to various embodiments, change notification coalescing is applicable to a wide variety of systems that use NPIV to implement HBA virtualization.

Figure 4:
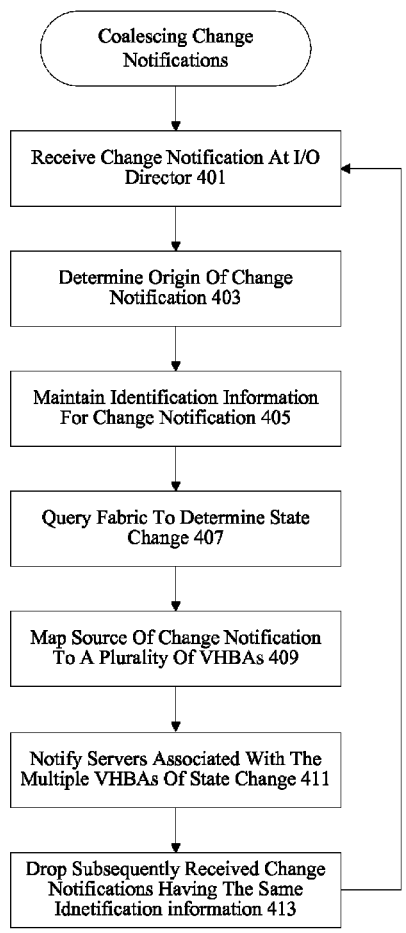
FIG. 4 illustrates one example of a technique for coalescing change notifications.

FIG. 4 illustrates one example of a technique for coalescing change notifications. According to various embodiments, a change notification such as an RSCN is received at 401 at an I/O director having a VHBA interface including multiple VHBAs. The received RSCN is directed at a particular VHBA associated with a particular server connected to the I/O director. At 403, it is determined where the event originated. According to various embodiments, the RSCN indicates what switch the event is coming from and may indicate a change in state of particular storage resources. At 405, identification information for the RSCN is maintained. According to various embodiments, origination, destination, and state change information is maintained for the RSCN.

According to various embodiments, the I/O director queries the fabric to determine the state change at 407. According to various embodiments, the state change may be zoning change, or the addition or removal of storage resources. In particular embodiments, the state change may be a domain change, the addition of an FC switch, or addition or loss of a link. According to various embodiments, the source of the RSCN is mapped to multiple VHBAs and the particular VHBAs at 409 and associated servers and servers are informed of the state change at 411. According to various embodiments, the servers are informed by forwarding the RSCN. In particular embodiments, subsequent RSCNs having the same identification information are discarded at 413.

Figure 5:
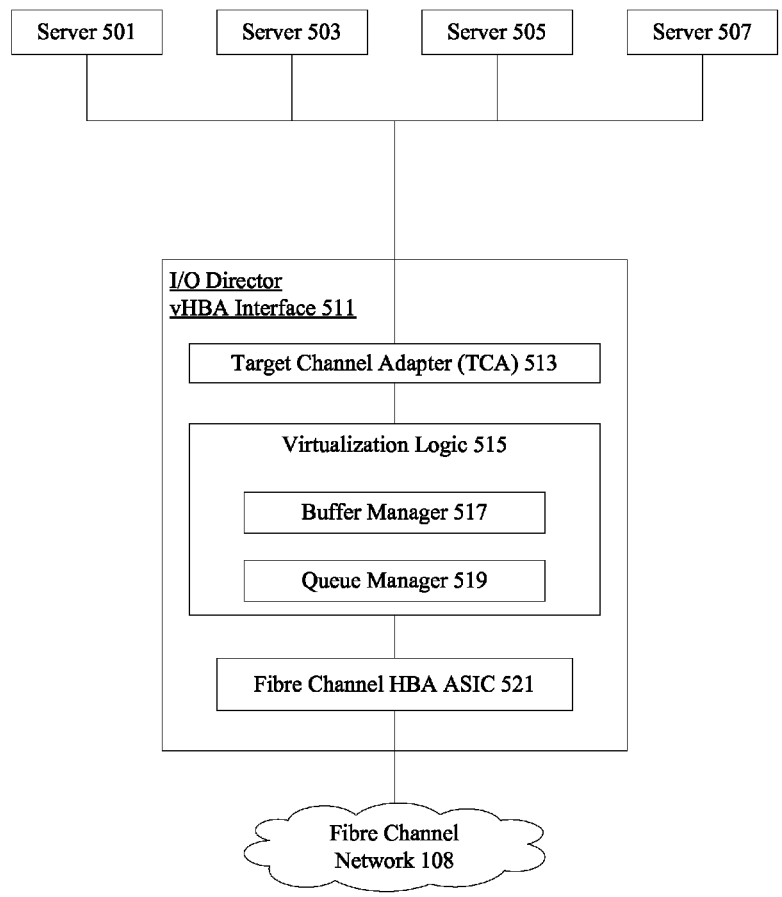
FIG. 5 illustrates one example of an I/O director.

FIG. 5 illustrates one example of an I/O director with a VHBA interface. According to various embodiments, an I/O director vHBA interface 511 is included in an I/O director that provides multiple servers 501, 503, 505, and 507 with virtualized I/O resources including virtualized vHBA resources. The I/O director includes a target channel adapter (TCA) 513. According to various embodiments, the TCA connects a vHBA module of the I/O director with servers 501, 503, 505, and 507 over an Ethernet, Infiniband, or PCI-Express network. A TCA can be a discrete device, or its functionality can be integrated into another device of the I/O module. A TCA may recognize and terminate various transport protocols (iWARP, RC, etc.)

According to various embodiments, the corresponding TCA removes the link and transport protocol headers (e.g., Ethernet link headers, iWARP/TCP/IP, RC, or other transport headers) from the packet when a server transmits a data packet to an I/O module. The TCA then forwards the packet with an internal header to virtualization logic 515.

The virtualization logic 515 may include a buffer manager 403 and a queue manager 405 and is connected to an FC HBA device 407. These elements may be implemented in a network processor or in hardware, such as FPGA or ASIC, which may also include the TCA functionality within the same device.

According to various embodiments, the server sends an I/O control block (IOCB) containing a command (e.g. a SCSI command) as well as various I/O control information, such as buffer information for data to be read or written. This IOCB propagates to the HBA according to the flow protocols described below. The two basic commands are the ones for reading data from and writing data to a target storage device.

According to various embodiments, the vHBA I/O interface 511 provides N_Port ID virtualization (NPIV) functionality. NPIV allows multiple FC initiators to share a single physical port. For example, each vHBA can be viewed as a separate initiator on the port. In this case, each vHBA that terminates on the port appears with its own world-wide name (WWN) on the Fibre Channel fabric. This approach makes management of vHBAs similar to other HBAs, including management of functions like Fibre Channel zoning configuration.

In particular embodiments, the vHBA buffer manager 517 is responsible for managing buffering of data when it is transferred from the servers to the FC HBA 521, and vice versa. The queue manager 519 may be used to enforce quality-of-service properties on the data transfer. In particular examples, the queue manager 519 modulates the transfer of data to and from the servers per vHBA to comply with the committed and peak bandwidth configurations for each vHBA. According to various embodiments, data transfers are initiated by the vHBA I/O module using RDMA Read operations for reading data from server memory and RDMA Write operations for writing data to server memory It should be understood that Fibre Channel is just one example of a storage connectivity technology that can be used for the described systems and methods. Other storage connectivity technologies include Internet Small Computer System Interface (iSCSI), Serial ATA (SATA), and Serial Attached SCSI (SAS).

I/O resources can be virtualized in a variety of manners. In particular embodiments, multiple Ethernet network interfaces of an I/O director are connected to multiple servers. The connections may be performed using a lossy Ethernet fabric or a lossless Ethernet fabric. According to various embodiments, the servers include NICs in order to connect to the Ethernet network interfaces using an Ethernet I/O fabric. The I/O director may include an Ethernet switch in order to connect to the servers over the Ethernet fabric. The Ethernet switch may be a lossless Ethernet switch or a lossy Ethernet switch.

An I/O director may contain one or more I/O modules of the same type or a combination of I/O modules of different types, such as vHBA I/O module and vNIC I/O module. Virtual I/O devices, such as vNICs and vHBAs are implemented in the respective I/O modules. According to various embodiments, servers are then associated with vNICs and/or vHBAs of the I/O director. Multiple servers may have virtual I/O resources on the same I/O modules or on different I/O modules. The I/O modules may be responsible for enforcing quality-of-server guarantees, such as committed and peak data rates, for the virtual I/O devices.

According to various embodiments, the I/O director can provide flexible termination points for the I/O resources assigned to servers. The I/O director may be connected to multiple Ethernet networks and/or Fibre Channel networks. In certain embodiments, the multiple output ports of the I/O director are connected to multiple external devices. Connection of a server to one or more networks is performed by assigning the server's vNICs and/or vHBAs to these networks. Therefore, servers can be connected to different physical networks without a need for re-cabling or any other physical intervention.

According to various embodiments, output ports are also mapped to vNICs and vHBAs. Various management protocols and learning protocols may also be used.

Figure 6:
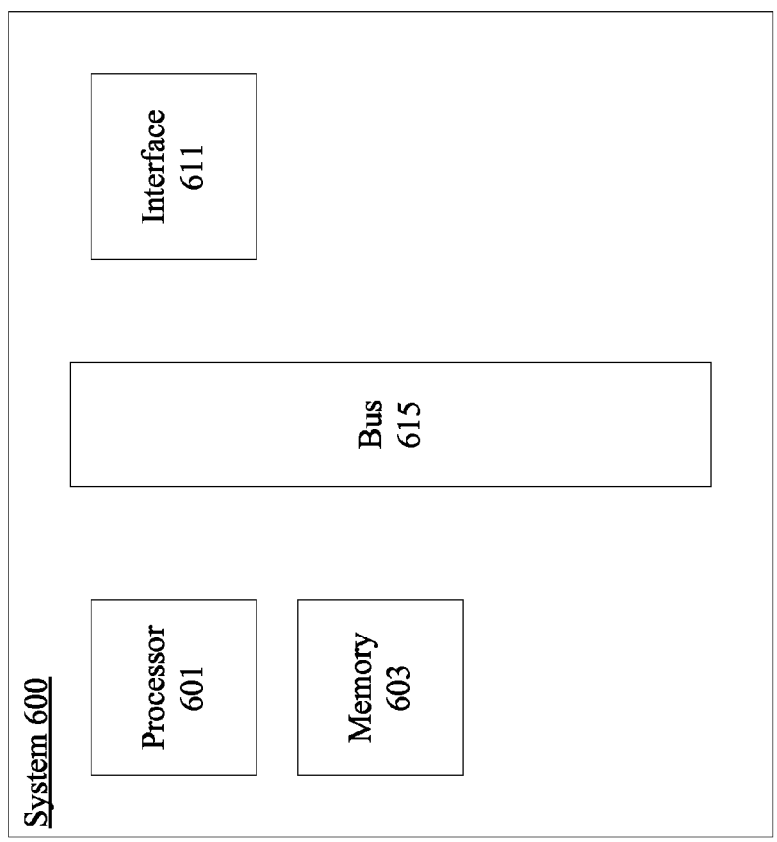
FIG. 6 provides one example of a system that can be used to implement one or more mechanisms.

According to various embodiments, various mechanisms such as the servers and I/O directors can be implemented on multiple devices. However, it is also possible that the various mechanisms be implemented in hardware, firmware, and/or software in a single system. FIG. 6 provides one example of a system that can be used to implement one or more mechanisms. For example, the system shown in FIG. 6 may be used to implement an I/O director.

According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as pattern generation. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include host bus adapter (HBA) interfaces, Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications intensive tasks.

According to particular example embodiments, the system 600 uses memory 603 to store data, algorithms and program instructions. The program instructions may control the operation of an operating system and/or one or more applications, for example. The memory or memories may also be configured to store received data and process received data.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
receiving a first change notification from a Fibre Channel (FC) fabric indicating a changed state of an origin of the change notification;

identifying the origin of the first change notification;
mapping the origin of the first change notification to a plurality of virtual Host Bus Adapters (VHBAs);
maintaining identification information for the first change notification;
forwarding change notification information to a plurality of servers corresponding to the plurality of VHBAs;
receiving a second change notification from the FC fabric, the second change notification received subsequent to the first change notification;
determining whether the second change notification has identification information matching the identification information maintained for the first change notification; and
in response to determining the second change notification has identification information matching the identification information maintained for the first change notification, discarding the second change notifications, wherein the change notifications are Registered State Change Notifications (RSCN) and wherein forwarding change notification information comprises forwarding the RSCN.

2. The method of claim 1, further comprising querying the FC fabric for information about a change in state corresponding to the first change notification.

3. The method of claim 1, wherein the origin of the first change notification is a node in the FC fabric.

4. The method of claim 1, wherein mapping the origin of the first change notification to the plurality of vHBAs comprises accessing a mapping table associating storage to corresponding vHBAs.

5. The method of claim 1, wherein the first change notification is received at an I/O director.

6. The method of claim 5, wherein the I/O director is configured to provide virtualized I/O resources to a plurality of individual servers.

7. The method of claim 5, wherein the I/O director is connected to an FC switch using physical Host Bus Adapters (HBAs) and is connected to a plurality of servers over an Infiniband network.

8. The method of claim 1, wherein the first change notification is received at a vHBA interface comprising a plurality of vHBAs.

9. A system, comprising:
a processor; and
a memory coupled with the processor and storing a set of instructions which, when executed by the processor, causes the processor to coalesce change notifications by:
receiving a first change notification from a Fibre Channel (FC) fabric indicating a changed state of an origin of the change notification;
identifying the origin of the first change notification;
mapping the origin of the first change notification to a plurality of virtual Host Bus Adapters (VHBAs);
maintaining identification information for the first change notification;
forwarding change notification information to a plurality of servers corresponding to the plurality of VHBAs;
receiving a second change notification from the FC fabric, the second change notification received subsequent to the first change notification;
determining whether the second change notification has identification information matching the identification information maintained for the first change notification; and
in response to determining the second change notification has identification information matching the identification information maintained for the first change notification, discarding the second change notifications, wherein the change notifications are Registered State Change Notifications (RSCN) and wherein forwarding change notification information comprises forwarding the RSCN.

10. The system of claim 9, further comprising querying the FC fabric for information about a change in state corresponding to the first change notification.

11. The system of claim 9, wherein the origin of the first change notification is a node in the FC fabric.

12. The system of claim 9, wherein mapping the origin of the first change notification to the plurality of vHBAs comprises accessing a mapping table associating storage to corresponding vHBAs.

13. The system of claim 9, wherein the first change notification is received at an I/O director.

14. The system of claim 13, wherein the I/O director is configured to provide virtualized I/O resources to a plurality of individual servers.

15. The system of claim 13, wherein the I/O director is connected to an FC switch using physical Host Bus Adapters (HBAs) and is connected to a plurality of servers over an Infiniband network.

16. A computer-readable memory storing a set of instructions which, when executed by a processor, cause the processor to coalesce change notifications by:
receiving a first change notification from a Fibre Channel (FC) fabric indicating a changed state of an origin of the change notification;
identifying the origin of the first change notification;
mapping the origin of the first change notification to a plurality of virtual Host Bus Adapters (VHBAs);
maintaining identification information for the first change notification;
forwarding change notification information to a plurality of servers corresponding to the plurality of VHBAs;
receiving a second change notification from the FC fabric, the second change notification received subsequent to the first change notification;
determining whether the second change notification has identification information matching the identification information maintained for the first change notification; and
in response to determining the second change notification has identification information matching the identification information maintained for the first change notification, discarding the second change notifications, wherein the change notifications are Registered State Change Notifications (RSCN) and wherein forwarding change notification information comprises forwarding the RSCN.

* * * * *

UNITED STATES PATENT AND TRADEMARK OFFICE
CERTIFICATE OF CORRECTION

| | | |
|---|---|---|
| PATENT NO. | : 8,458,306 B1 | Page 1 of 1 |
| APPLICATION NO. | : 12/862977 | |
| DATED | : June 4, 2013 | |
| INVENTOR(S) | : Sripathi | |

It is certified that error appears in the above-identified patent and that said Letters Patent is hereby corrected as shown below:

In the Drawings:

On sheet 1 of 6, in figure 1, Referral Numeral 133, line 1, delete "Chanel" and insert -- Channel --, therefor.

On sheet 4 of 6, in figure 4, Referral Numeral 413, line 3, delete "Idnetification" and insert -- Identification --, therefor.

In the Specification

In column 3, line 47, delete "209," and insert -- 209. --, therefor.

In column 3, line 63, delete "notifcations." and insert -- notifications. --, therefor.

In column 5, line 25, delete "memory" and insert -- memory. --, therefor.

Signed and Sealed this
Eighth Day of October, 2013

Teresa Stanek Rea
*Deputy Director of the United States Patent and Trademark Office*